(12) United States Patent
Woodhouse et al.

(10) Patent No.: US 8,973,966 B2
(45) Date of Patent: Mar. 10, 2015

(54) SEATING ARRANGEMENT FOR A PASSENGER VEHICLE

(71) Applicant: Ford Global Technologies, LLC, Dearborn, MI (US)

(72) Inventors: David Woodhouse, Bromsgrove (GB); Torsten Gerhardt, London (GB); Robert Spahl, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/076,954

(22) Filed: Nov. 11, 2013

(65) Prior Publication Data

US 2014/0152041 A1 Jun. 5, 2014

(30) Foreign Application Priority Data

Dec. 4, 2012 (GB) .................................... 1221811.1
Oct. 16, 2013 (GB) .................................... 1318278.7

(51) Int. Cl.
*B60N 2/00* (2006.01)
*B60N 2/01* (2006.01)

(52) U.S. Cl.
CPC ........................................ *B60N 2/01* (2013.01)
USPC .......................................... 296/64; 296/65.06

(58) Field of Classification Search
CPC ......................................................... B60N 2/01
USPC ....................... 296/64, 65.01, 65.06
See application file for complete search history.

(56) References Cited

U.S. PATENT DOCUMENTS

| | | | | |
|---|---|---|---|---|
| 1,214,897 A | * | 2/1917 | Clarke | ......................... 180/89.1 |
| 1,760,422 A | * | 5/1930 | Mackie | ......................... 280/166 |
| 2,839,312 A | * | 6/1958 | Barenyi et al. | ................ 280/775 |
| 3,352,597 A | * | 11/1967 | Barenyi et al. | ............. 296/181.1 |
| 3,685,854 A | * | 8/1972 | Cadiou | ......................... 180/90.6 |
| 3,694,025 A | * | 9/1972 | Buehrig | ......................... 296/64 |
| 4,218,092 A | | 8/1980 | Schach et al. | |
| 4,382,628 A | * | 5/1983 | Palmgren | ...................... 297/232 |
| 4,489,972 A | * | 12/1984 | Monzini | ......................... 296/64 |
| 5,435,624 A | | 7/1995 | Bray et al. | |
| 5,456,019 A | | 10/1995 | Dowell et al. | |
| 5,716,026 A | * | 2/1998 | Pascasio et al. | ............. 244/118.6 |
| 5,737,845 A | | 4/1998 | Marasus | |

(Continued)

FOREIGN PATENT DOCUMENTS

DE 19702572 A1 2/1998
DE 19916179 A1 10/2000

(Continued)

OTHER PUBLICATIONS

Madabout News, "MEV announce the new R2," Dec. 12, 2007 (3 pages), Madabout Kitcars.com.

(Continued)

*Primary Examiner* — Lori L Lyjak
(74) *Attorney, Agent, or Firm* — Vichit Chea; Price Heneveld LLP

(57) ABSTRACT

A seating assembly for a vehicle includes a stepped floor that has an upper portion and a lower portion. A front seat is disposed on the lower portion. A rear seat is arranged in a staggered relationship behind the front seat. The front seat is mounted high and has an upright backrest and the rear seat has a backrest that is more reclined than the backrest of the front seat.

19 Claims, 9 Drawing Sheets

(56) References Cited

U.S. PATENT DOCUMENTS

| | | | |
|---|---|---|---|
| 7,938,488 B2 * | 5/2011 | Thiel et al. | 297/312 |
| 8,267,456 B2 * | 9/2012 | Murray | 296/64 |
| 8,523,281 B2 | 9/2013 | Wahls | |
| 2007/0241235 A1 | 10/2007 | Atchison | |
| 2010/0148557 A1 * | 6/2010 | Schmitz | 297/362 |
| 2010/0187850 A1 * | 7/2010 | Murray | 296/64 |
| 2011/0304191 A1 * | 12/2011 | Markel et al. | 297/408 |

FOREIGN PATENT DOCUMENTS

| | | |
|---|---|---|
| DE | 102007060818 A1 | 6/2009 |
| EP | 0669245 A1 | 8/1995 |
| FR | 2826616 A1 | 1/2003 |
| FR | 2961142 A1 | 12/2011 |
| GB | 1012559 | 8/1964 |
| GB | 1358783 | 7/1974 |
| WO | 8200618 | 3/1982 |
| WO | 9903377 A1 | 1/1999 |
| WO | 2008110814 A2 | 9/2008 |
| WO | 2009083773 A1 | 7/2009 |
| WO | 2013111167 A1 | 8/2013 |

OTHER PUBLICATIONS

Honest John, "Volkswagen unveils XL1 concept car," Jan. 1, 2011 (3 pages), Honestjohn.co.uk.

Chappell, Dale, "Bugatti Type 23 'Brescia', staggered seating detail, c1926," Feb. 1, 2011 (2 pages), Chappells 10.

Quick, Darren, "Audi urban concept defies conventional categorization," Aug. 9, 2011 (9 pages), Gizmag.

Taylor, Alfred, "Amazing world of three-wheeled vehicles," Sep. 22, 2011 (18 pages), Judgmental.

SAE International, "Devices for Use in Defining and Measuring Vehicle Seating Accommodation," 2014 (1 page).

Jalopy Journal.com, "An Early Factory Hot Rod, The Jesse Vincent Speedster," date unknown (13 pages), Lexis Legal Community.

Early American Automobiles.com, "History of Early American Automobile Industry 1891-1929," date unknown (30 pages).

USPTO, Office Action for U.S. Appl. No. 14/076,919, dated May 22, 2014 (11 pages).

* cited by examiner

SEATING ARRANGEMENT FOR A PASSENGER VEHICLE

CROSS-REFERENCE TO RELATED APPLICATIONS

The present application is related to co-pending U.S. patent application Ser. No. 14/076,919 filed Nov. 11, 2013, entitled "SEATING ARRANGEMENT FOR A PASSENGER VEHICLE"; co-pending U.S. patent application Ser. No. 14/076,928, filed Nov. 11, 2013, entitled "SEATING ARRANGEMENT FOR A PASSENGER VEHICLE"; co-pending U.S. patent application Ser. No. 14/076,942, filed Nov. 11, 2013, entitled "MOTOR VEHICLE SEAT HAVING AN ARMREST"; co-pending U.S. patent application Ser. No. 14/076,964, filed Nov. 11, 2013, entitled "SEATING ARRANGEMENT FOR A PASSENGER VEHICLE"; and co-pending U.S. patent application Ser. No. 14/076,969, filed Nov. 11, 2013, entitled "SEATING ARRANGEMENT FOR A PASSENGER VEHICLE", all of which are incorporated herein by reference in their entireties.

FIELD OF THE INVENTION

The present invention generally relates to a seating arrangement for a powered passenger vehicle that is particularly suitable for fitment to a vehicle having small overall dimensions.

BACKGROUND OF THE INVENTION

A common problem faced by modern car users is the lack of parking space in cities and large towns. In an effort to provide more parking there has been a trend by local authorities to reduce the size of parking bays so as to provide more parking bays along a given length of road.

SUMMARY OF THE INVENTION

According to one aspect of the present invention, a seating assembly for a vehicle includes a stepped floor that has an upper portion and a lower portion. A front seat is disposed on the lower portion. A rear seat is arranged in a staggered relationship behind the front seat. The front seat is mounted high and has an upright backrest and the rear seat has a backrest that is more reclined than the backrest of the front seat.

According to another aspect of the present invention, a vehicle seating assembly includes a front seat. A rear seat is arranged in a staggered relationship behind the front seat. The front seat is mounted high and has an upright backrest and the rear seat has a backrest that is more reclined than the backrest of the front seat.

It is a first object of the invention to provide a seating arrangement to facilitate the production of a motor vehicle having small overall dimensions while providing better accommodation for the passenger.

According to a first aspect of the invention there is provided a seating arrangement for a passenger vehicle having a central longitudinal axis, the seating arrangement including front and rear seats arranged in a staggered relationship, wherein at least the front seat is mounted high and has an upright backrest and the rear seat has a backrest that is more reclined than the backrest of the front seat.

An upright backrest may be a backrest having an inclination relative to vertical of less than 23 degrees. The rear seat may have an inclination relative to vertical of more than 23 degrees.

A high mounted seat may be a seat having an H-point height measured with respect to a heel contact point in the range of 0.375 m to 0.495 m. The front seat may have an H-point height measured with respect to a heel contact point in the range 0.4 m to 0.45 m.

At least one of the seats may be positioned such that a central longitudinal axis of the respective seat at a rear edge of the seat is mounted closer to the central longitudinal axis of the passenger vehicle than is possible with a symmetrical side-by-side seating arrangement by mounting the respective seat a distance measured from the central longitudinal axis of the respective seat at a rear edge of the seat to the central longitudinal axis of the passenger vehicle that is less than half the width of the respective seat.

Both seats have respective central longitudinal axes and the distance of the respective central longitudinal axis of each seat at a rear edge of the respective seat from the central longitudinal axis of the passenger vehicle is less than half the width of the respective seat.

The rear seat may have a backrest arranged at a fixed inclination angle and the backrest of the front seat may have a recline mechanism to permit the front seat backrest to be reclined within a predefined range and the predefined range has a maximum inclination angle limit that is less than the fixed inclination angle of the rear seat backrest.

Each of the backrests has a recline mechanism to permit the respective backrest to be reclined within a predefined range having respective maximum and minimum inclination angle limits and the maximum inclination angle limit for the front seat backrest is less than the minimum inclination angle limit for the rear seat backrest.

Both of the backrests may include a recline mechanism and the recline mechanisms for the front and rear seat backrests may be interlinked to each other by means of a mechanical device to ensure that the backrests remain at a predetermined offset angle with respect to each other irrespective of the angle the front seat backrest is set to so as to maintain the rear seat backrest more reclined than the backrest of the front seat.

Both of the backrests may include a recline mechanism and the recline mechanisms may be interlinked by at least one electronic logic system that includes one or more recline sensing devices for the front and rear seat backrests and at least the rear seat backrest has a powered recline adjuster, the at least one electronic logic system may be arranged to ensure that the two backrests remain at a predetermined offset angle with respect to one another irrespective of the angle the front seat backrest is set to so as to maintain the rear seat backrest more reclined than the backrest of the front seat.

Both of the backrests may include a recline mechanism and at least the passenger seat recline mechanism may include an adjustable rotation stop for the rear seat backrest to prevent forward rotation of the rear seat backrest beyond a predetermined position and the front seat backrest recline mechanism is interlinked to the adjustable rotation stop for the rear seat backrest by means of a mechanical device to ensure that a minimum offset angle is maintained between the rear seat backrest and the front seat backrest irrespective of the angle that the front seat backrest is set to so as to maintain the rear seat backrest more reclined than the backrest of the front seat.

Both of the backrests may include a recline mechanism and at least the passenger seat recline mechanism may include a powered adjustable rotation stop for the rear seat backrest to prevent forward rotation of the rear seat backrest beyond a predetermined position and the front seat backrest recline mechanism and the adjustable rotation stop of the rear seat incline mechanism may be interlinked by at least one electronic logic system that includes one or more recline sensing devices for the front and rear seat backrests and the at least one electronic logic system may use the powered adjustable rotation stop to ensure that a minimum offset angle is maintained between the rear seat backrest and the front seat backrest irrespective of the angle the front seat backrest is set to so as to maintain the rear seat backrest more reclined than the backrest of the front seat.

A decoupling device may be provided to permit the rear seat backrest to be folded forward irrespective of the actions of any interlink between the front and rear seat backrests.

The rear seat backrest recline mechanism may include one of a mechanical decoupling device and an electronic decoupling device for decoupling the interlink between the front and rear seat backrests to permit the rear seat backrest to be folded flat for load carrying purposes.

According to a second aspect of the invention there is provided a compact passenger vehicle having a source of motive power and a seating arrangement constructed in accordance with said first aspect of the invention located in a passenger compartment of the vehicle.

The motor vehicle may have a longitudinally stepped floor having a lower part upon which is mounted the front seat and an upper part upon which is mounted the rear seat and the rear seat may not be high mounted and may have a backrest that is not upright.

The motor vehicle may have a transversely stepped floor having a front lower part upon which is mounted the front seat and a rear upper part upon which is mounted the rear seat.

The H-points for the front and rear seats may be located on a common horizontal plane.

These and other aspects, objects, and features of the present invention will be understood and appreciated by those skilled in the art upon studying the following specification, claims, and appended drawings.

BRIEF DESCRIPTION OF THE DRAWINGS

The invention will now be described by way of example with reference to the accompanying drawing of which.

DETAILED DESCRIPTION OF THE EMBODIMENTS

Figure 1:
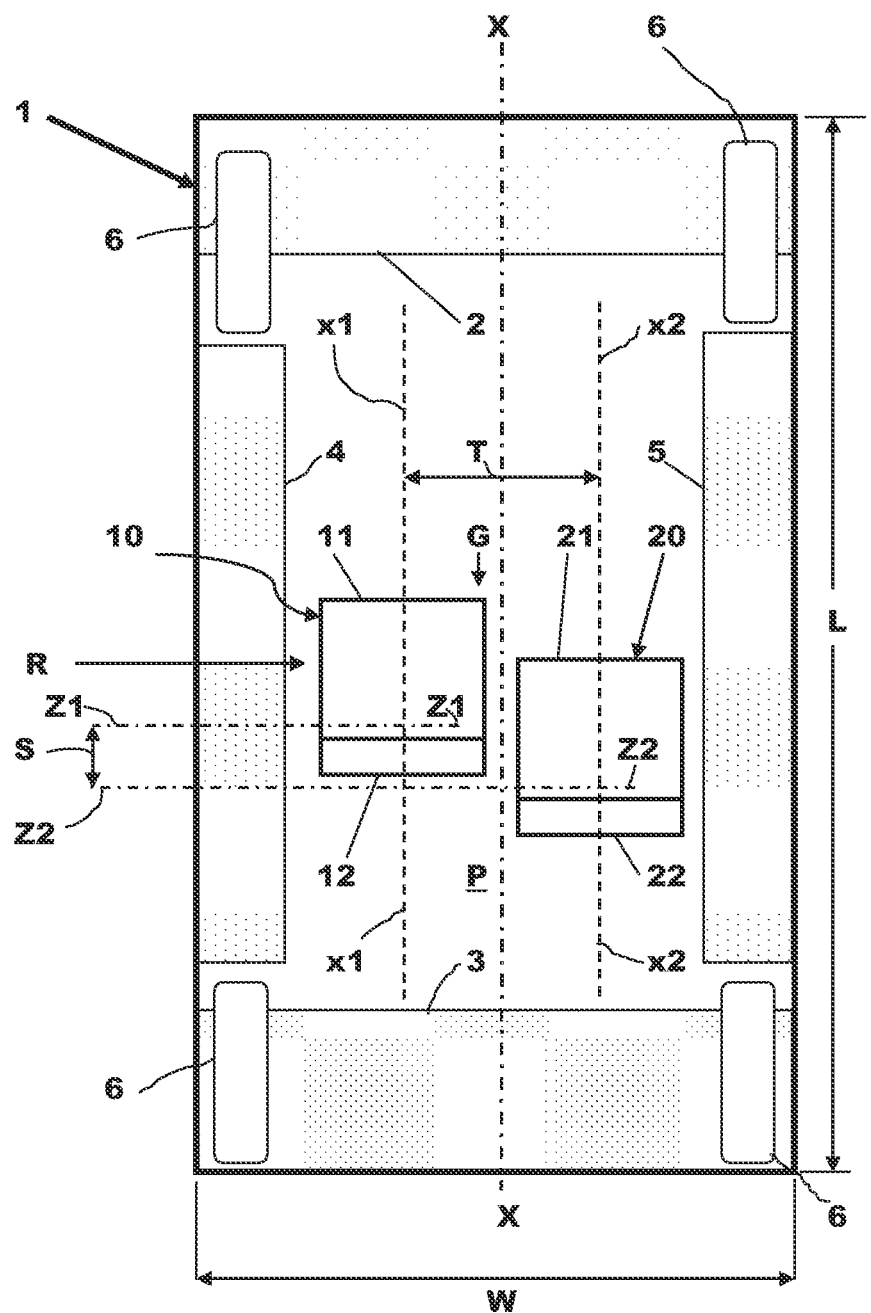
FIG. 1 is a schematic plan view of a motor vehicle having a first embodiment of a seating arrangement according to a first aspect of the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
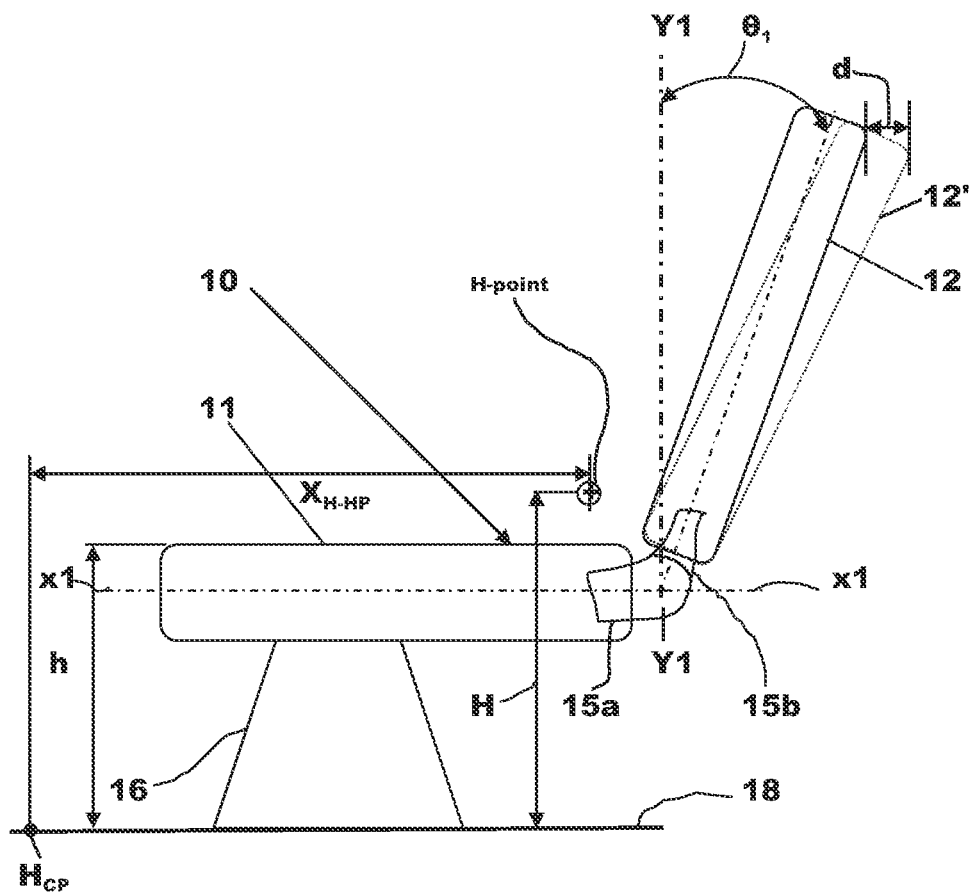
FIG. 2 is a schematic side view on an enlarged scale in the direction of arrow 'R' on FIG. 1 of a front one of the two seats shown in FIG. 1.
Figure 3:
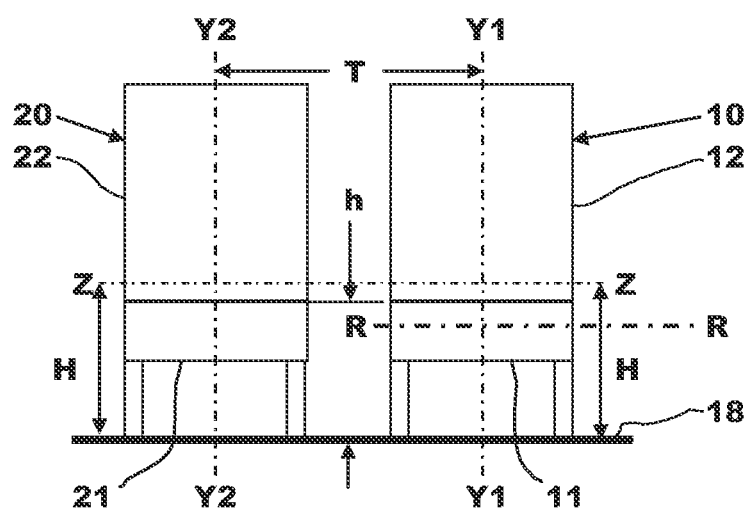
FIG. 3 is a schematic front view in the direction of arrow 'G' on FIG. 1 of the two seats forming the first embodiment seating arrangement.

With particular reference to FIGS. 1-3 there is shown a first embodiment of a seating arrangement for a passenger vehicle in the form of a compact city car 1. The seating arrangement is located in a passenger compartment 'P' of the vehicle 1.

With reference again to FIG. 1, the motor vehicle 1 includes a body structure having a front crush zone 2, two side crush zones 4, 5, a rear crush zone 3 and has four wheels 6 connected to the body structure via a conventional suspension system. The vehicle 1 has a central longitudinal axis X-X that extends from a front end of the vehicle 1 to a rear end of the vehicle 1. It will be appreciated that the vehicle 1 could be powered by any known source of motive power including, but not limited to, a combustion engine, an electric motor or a combination of same. The source of motive power can be mounted at any convenient location and can drive the vehicle 1 by any suitable form of transmission. It will also be appreciated that the motor vehicle could have three wheels or more than four wheels.

As shown in FIGS. 1-3, the seating arrangement includes a front seat 10 and a rear seat 20 arranged in a staggered relationship to one another. That is to say, the front and rear seats 10 and 20 are offset in a longitudinal direction by a longitudinal stagger distance S. The front seat 10 is a seat for a driver of the vehicle 1 and the rear seat 20 is a seat for a passenger of the vehicle 1. The stagger distance S is measured between two transverse hip pivot axes Z1-Z1 and Z2-Z2 each of which extends through an H-point for the respective seat 10, 20. The H-point is an important characteristic for all vehicle seat design and is the point that corresponds to the pivot axis of the hips of an occupant of the seat. A stagger distance S of 0.3 to 0.35 m has been shown to provide a good compromise between vehicle compactness and comfort for the occupants. The longitudinal stagger distance S can conveniently be measured between the H-point for a $95^{th}$ percentile male front occupant and the H-point for a $95^{th}$ percentile male rear occupant.

With reference to FIGS. 2 and 3, the H-point of each seat 11, 20 is defined in terms of a vertical distance H (Y axis) and a horizontal longitudinal distance $X_{H-HP}$ (X axis) measured from a known reference point referred to as the heel contact point $H_{CP}$ (the heel contact point $H_{CP}$ for the front seat 10 is shown in FIG. 2). The heel contact point $H_{CP}$ is the position where a heel of a person sat in the seat 10, 20 is located. As the heel of an occupant is resting on a floor 18 of the vehicle 1, the height H is effectively the vertical height of the H-point above the floor 18 assuming the floor 18 is flat and the heel contact point $H_{CP}$ is the position of contact of a heel of a $95^{th}$ percentile male occupant with the floor. The heel contact point $H_{CP}$ represents a reference point from which the vertical and horizontal longitudinal positions of the H-point are measured.

Referring again to the embodiment illustrated in FIGS. 1-3, the front seat 10 is mounted in the vehicle 1 forward relative to the rear seat 20 by an amount equal to the stagger distance S. That is to say, the front seat 10 is mounted closer to the front end of the vehicle 1 than the rear seat 20. The front seat 10 has a seat squab 11 and a backrest 12 arranged at an obtuse angle with respect to the seat squab 11. The seat squab 11 is attached to the floor 18 of the vehicle 1 by means of a seat mounting structure 16. The seat mounting structure 16 is used to mount the respective seat squab 11 on the floor 18 of the vehicle 1 and may provide the ability to adjust the seat 10 at least in a longitudinal direction of the vehicle 1 so as to suit occupants of differing stature.

The rear seat 20 has, like the front seat 10, a seat squab 21 and a backrest 22 arranged at an obtuse angle with respect to the seat squab 11. The seat squab 21 is attached to the floor 18 of the vehicle 1 by means of a seat mounting structure which may provide at least longitudinal adjustment for the seat 20. Because both of the seat squabs 11, 21 are mounted the same distance h from the floor 18 and the floor 18 is flat, both of the hip pivot axes Z1-Z1 and Z2-Z2 fall on a common plane indicated on FIG. 3 by the line Z-Z.

It will be appreciated that the actual height h of the seat squab 11 is different to the height of the H-point but there is a relationship between undeflected seat squab height h and H-point height H. That is to say, if the undeflected seat squab height h is increased then the H-point height H will also increase. An H-point is normally located approximately 0.095 m above the undeflected top surface of the respective seat squab.

In order to meet the length restriction for a vehicle 1 to enable nose-in parking at least the front seat squab 11 needs to be high mounted. The term H point height as meant herein is the height from a heel contact point $H_{CP}$ to the location of the H-point. Whether a seat is high mounted depends upon the vertical height H between the respective heel contact point $H_{CP}$ and the respective H-point and not the height of the respective seat squab above the floor upon which the seat is mounted or the height of the seat squab above the road.

By mounting a seat high, the longitudinal distance $X_{H-HP}$ between the heel contact point $H_{CP}$ and the respective H-point is reduced. This is because a high mounted seat squab results in the lower leg portions (tibia and fibula) of an occupant naturally being more vertically positioned thereby reducing the horizontal distance $X_{H-HP}$. This has the effect of allowing a reduction in the distance that needs to be provided between the front seat 10 and a forward end of the passenger compartment P. That is to say, the passenger compartment P can be made shorter.

If both of the seat squabs 11, 21 are mounted higher than would normally be the case for a passenger vehicle, that is to say, the H-point heights H for the two seats are greater than that normally used for a passenger vehicle, both of the occupants will have better forward visibility due to their higher seating position relative to the floor of the vehicle. This is particularly advantageous in city or urban motoring where advance warning of a pedestrian in the road greatly improves safety. It is normal for passenger vehicles to mount the seats such that an H-point height is less than about 0.35 m and typically the H-point height for a passenger vehicle will be about 0.3 m.

By mounting both seat squabs 11, 21 at a height h that provides a heel to floor contact point to H-point height H in a general range of 0.375 m to 0.495 m, or alternatively in a range of 0.4 to 0.45 m, a good result can be achieved. Although it would possible to mount the seat with an H-point higher than the upper limit of the general range, there are several disadvantages with a seat mounted so as to provide an H-point greater than the upper limit of the above range. Firstly, moving an occupant higher raises their center of gravity with a negative effect on the transverse stability of the vehicle during cornering and also occupants of below average height may find it difficult to sit comfortably because the seat squab is mounted too high. If the seat is mounted lower than the lower limit of the above range then an upright backrest cannot be comfortably used unless the lower legs portions are extended forwardly thereby greatly increasing the heel to H-point horizontal distance.

To provide a compact and comfortable seating position for a $95^{th}$ percentile male occupant, the mounting of a seat squab at a height h that provides a heel contact point $H_{CP}$ (floor) to H-point height H in the range of 0.4 m to 0.45 m has been found to produce a particularly good result. Therefore, by using an H-point height H within the above ranges an upright backrest can be used while maintaining comfort for an occupant of the seat.

Each of the seats 10, 20 has a respective central longitudinal axis x1-x1, x2-x2 arranged parallel to the central longitudinal axis X-X of the vehicle 1. The longitudinal axes of the two seats 10, 20 are positioned on opposite sides of the central longitudinal axis X-X of the motor vehicle 1 and in the example shown the front seat is a left hand side driver's seat 10 and the rear seat is a right hand side passenger seat 20 because the vehicle 1 is a left hand driver vehicle. In order to minimize vehicle width W, a transverse distance or spacing T between the central longitudinal axes x1-x1; x2-x2 of the two seats 10, 20 needs to be kept small.

Although in FIG. 1 the two seats 10, 20 are shown spaced apart so that there is no overlap between the seats 10, 20, in practice there will be some overlap between the two seats 10, 20. At least one of the seats 10, 20 is positioned such that its central longitudinal axis x1-x1; x2-x2 as measured at a rear edge of the respective seat 10, 20 is mounted closer to the central longitudinal axis X-X of the passenger vehicle 1 than would be possible with a symmetrical side-by-side seating arrangement. This is achieved by mounting the respective seat 10, 20 a distance, measured from the central longitudinal axis of the respective seat x1-x1; x2-x2 at a rear edge of the respective seat 10, 20 to the central longitudinal axis X-X of the passenger vehicle 1, that is less than half the width of the respective seat 10, 20. For example, if the width of the respective seat 10, 20 is 0.44 m, then the distance from the central longitudinal axis of the respective seat 10, 20 to the central longitudinal axis X-X of the passenger vehicle 1 would be less than 0.22 m. The width of a seat 10, 20 in this case is the width of the respective seat squab 11, 21 and the rear edge of a seat 10, 20 is the rear edge of the respective seat squab 11, 21.

In some embodiments both seats 10, 20 have their respective central longitudinal axes x1-x1; x2-x2 at a rear edge of each seat positioned from the central longitudinal axis X-X of the passenger vehicle 1 a distance that is less than half the width of the respective seat.

For example, if the width of both seats 10, 20 is 0.44 m, the distance from the central longitudinal axis of each seat 10, 20 at a rear edge of the respective seat 10, 20 to the central longitudinal axis X-X of the passenger vehicle 1 would be less than 0.22 m.

The seat squab 21 of the rear mounted seat 20 may be shaped so as to avoid contact with the seat squab 11 of the front mounted seat 10. In addition the rear seat 20 may be rotated outwardly by a small amount such as seven degrees to increase clearance between the left hand leg of the passenger and the front seat and right hand leg of the driver.

One advantage of the use of a high mounted seat is that if the seat 10, 20 is fitted with a fore-aft position adjuster so as to permit the seat 10, 20 to be moveable in a longitudinal direction of the passenger vehicle 1, the H-point height of the seat 10, 20 can remain substantially constant irrespective of the longitudinal position of the seat within the passenger vehicle 1. That is to say, there is no need to provide a seat height adjuster to the seat 10, 20 thereby saving cost. Therefore if both of the seats 10, 20 have fore-aft adjusters and are high mounted then the cost of two seat height adjusters can potentially be saved.

However, if fore-aft adjustment is provided a mechanism is provided to prevent users of the passenger vehicle 1 from reducing the stagger distance S below a lower limit such as for example 0.3 m. In the situation where the front seat 10 can move in a fore-aft direction this can be achieved by restricting the rearward travel of the front seat 10. In the case where both seats can move then an interlock or other means is provided to prevent the rear seat 20 from being moved too close to the front seat 10 or vice-versa.

By using two high mounted seat squabs 11, 21 an upright backrest position can be used for both seats 10, 20 without causing discomfort to the users of the seats 10, 20. This is because, when sitting on a high mounted seat squab, the upper leg portions (femurs) of an occupant tend to be more horizontally disposed than is the case with a low mounted seat squab. Therefore a high mounted seat squab permits a more upright backrest to be used without reducing the angle between the upper leg portions (femurs) of the occupant and the spine of the occupant to an unacceptable amount.

The backrest 12 of the front seat 10 is adjustably connected to the seat squab 11 via a backrest recline adjuster mechanism. The backrest recline adjuster mechanism includes a first arm 15a attached to the seat squab 11, a second arm 15b attached to the backrest 12 and a recline adjuster. The recline adjuster enables the second arm 15b to be positioned in various recline angles while the first arm 15a remains substantially horizontally disposed.

The backrest recline adjuster mechanism permits the backrest 12 to be reclined within a predefined range of movement $\delta_1$. (See FIGS. 7a and 8a).

Figure 7A:
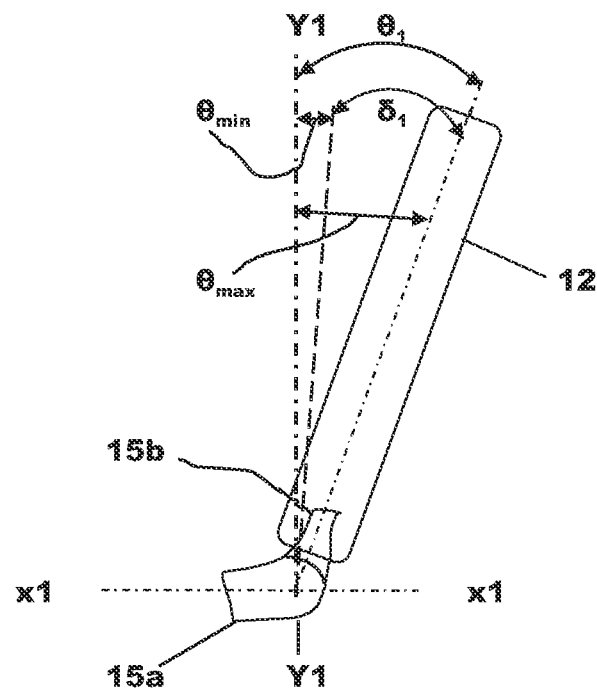
FIG. 7a is a schematic side view similar to FIG. 2 but showing a backrest of the front one of the two seats and a range of recline movement possible for the backrest of the front seat.
Figure 8A:
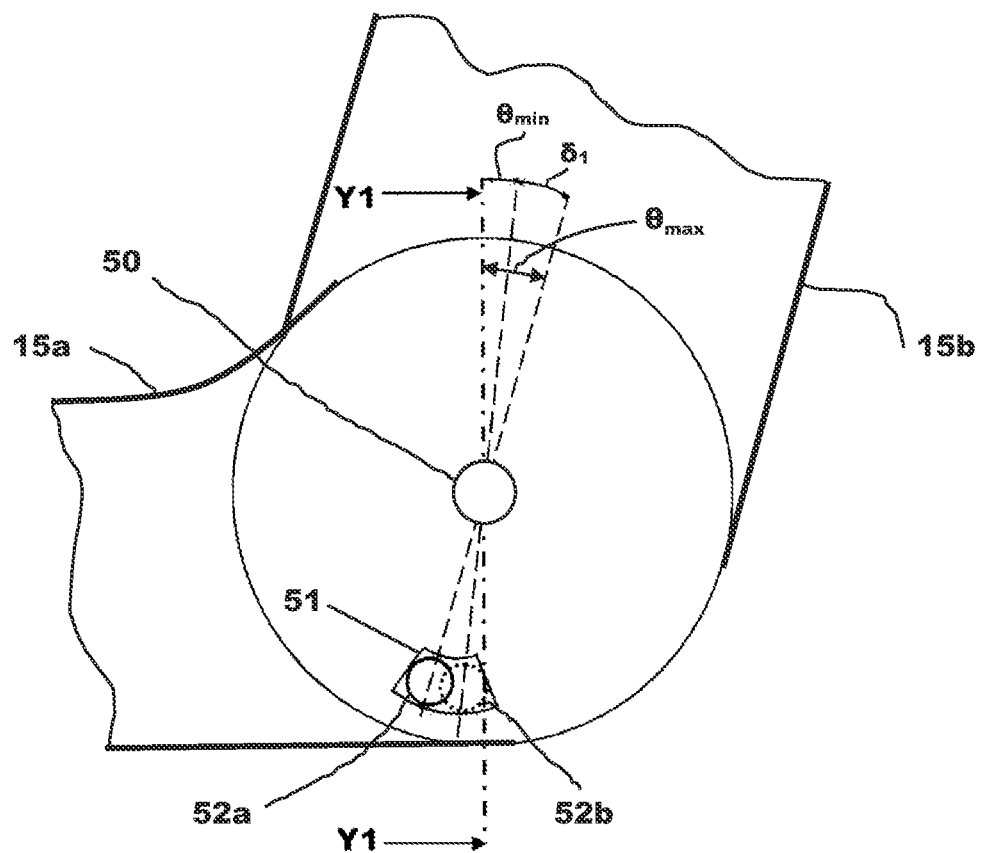
FIG. 8a is an enlarged perspective side view showing one embodiment of a recline range limiter for the front seat of the motor vehicle.

It is desirable if the backrest 12 of the front seat 10 is positioned upright during use, that is to say, it is inclined relative to vertical by a relatively small recline angle $\theta_1$ lying within the range $\delta_1$. The range $\delta_1$ is bounded at a lower end by a minimum recline angle $\theta_{min}$ and at an upper end by a maximum recline angle $\theta_{max}$. In FIG. 7a the backrest 12 is shown in its most reclined position and so, in this recline position, the angle of recline $\theta_1$ is equal to the maximum recline angle $\theta_{max}$.

The term 'upright backrest' means a backrest having an inclination relative to vertical less than about 23 degrees.

The recline angle $\theta_1$ is measured relative to a vertical axis Y1-Y2 which is a vertical axis of the vehicle 1 passing through a point corresponding to a transverse pivot axis R-R of the backrest 12.

Figure 7B:
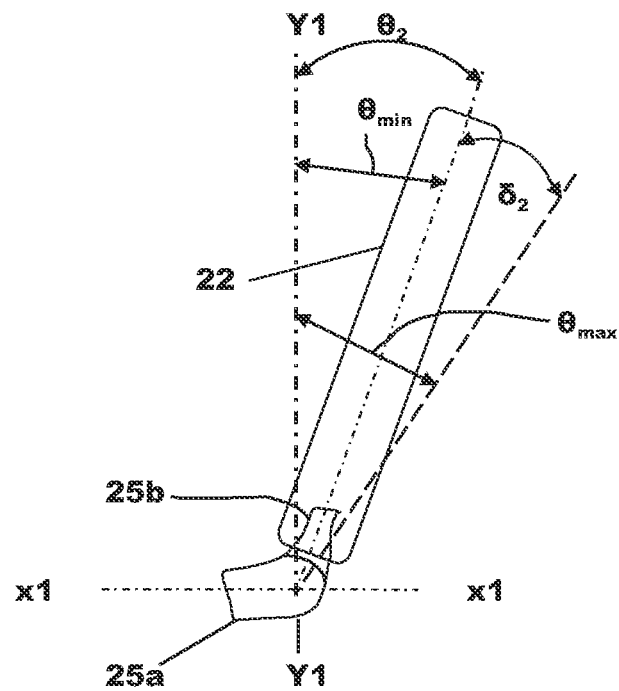
FIG. 7b is a schematic side view similar to FIG. 7a but showing a backrest of a rear one of the two seats and a range of recline movement possible for the backrest of the rear seat.
Figure 8B:
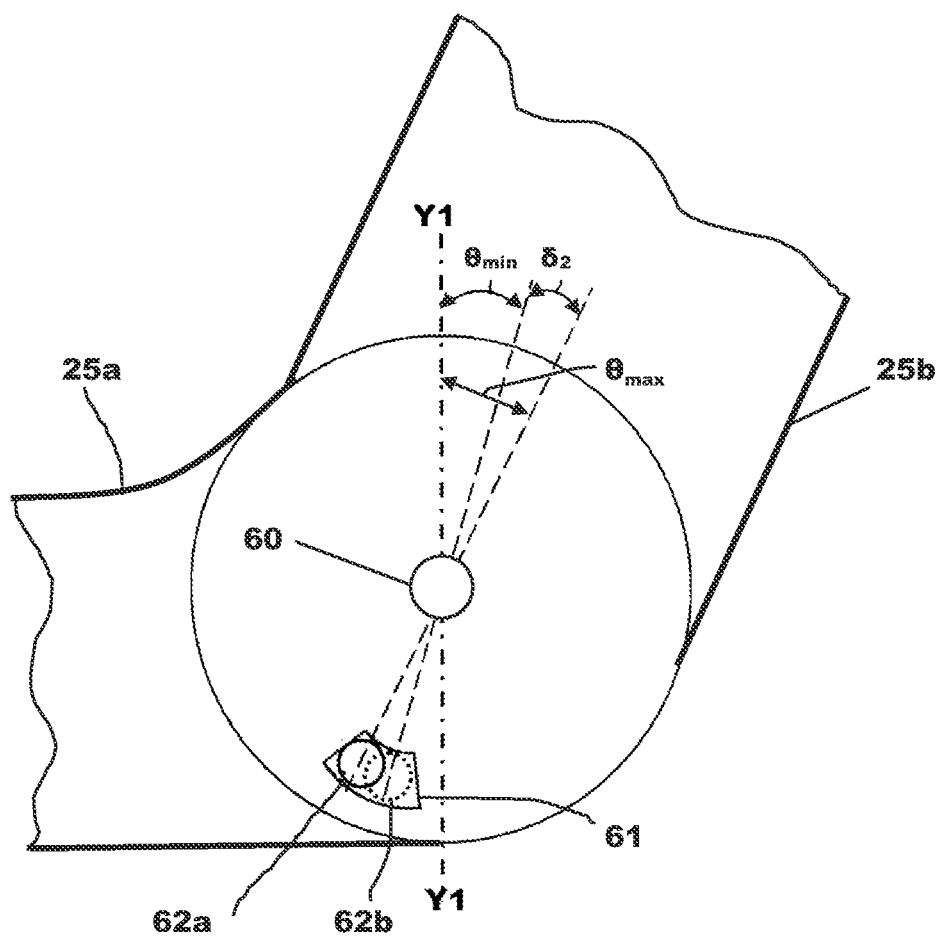
FIG. 8b is an enlarged perspective side view showing one embodiment of a recline range limiter for the rear seat of the motor vehicle.

As shown in FIGS. 7b and 8b, the rear backrest 22 is also adjustably connected to the rear seat squab 21 via a backrest recline adjuster mechanism including a first arm 25a attached to the seat squab 21 and a second arm 25b attached to the backrest 22. A recline adjuster is provided to enable the second arm 25b to be positioned in various different recline angles while the first arm 25a remains substantially horizontally disposed. The recline adjuster is in this case the same as that used for the front seat 10 but, as previously mentioned, various other types of recline adjuster are available and the invention is not limited to the use of such a recline adjuster.

The backrest recline adjuster mechanism permits the backrest 22 to be reclined within a predefined range of movement $\delta_2$.

It will be appreciated that a mechanism to decouple the recline mechanism may also be provided so as to permit the seat to be folded flat.

The backrest 22 in use is inclined relative to vertical by an recline angle $\theta_2$ lying within the range $\delta_2$ bounded at a lower end by a minimum recline angle $\theta_{min}$ and at an upper end by a maximum recline angle $\theta_{max}$. In FIG. 7b the backrest 22 is shown in its most upright position and so in this recline position the angle of recline $\theta_2$ is equal to the minimum recline angle $\theta_{min}$.

When in use, the backrest 22 of the rear seat 20 is inclined relative to the vertical more than the backrest 12 of the front seat 10. That is to say, the backrest 22 of the rear seat 20 is more reclined than the backrest 12 of the front seat 10. One way to ensure that this relationship subsists in the case where backrest recline adjuster mechanisms are provided for both seats 10, 20 is to make sure that there is no overlap between the ranges of movement $\delta_1$ and $\delta_2$ provided for the two backrests 12, 22.

For example, if the range of movement $\delta_1$ is set at 15 to 23 degrees from the vertical, the range of movement $\delta_2$ would be set with a lower limit more than 23 degrees such as for example 23.5 degrees. In such a case, the range of movement $\delta_2$ could be set at 23.5 to 35 degrees.

Although the backrest 22 for the rear seat 20 does not need to be upright it would be possible for both of the backrests 11, 21 to be upright. That is to say, the respective adjustment ranges for the front and rear backrests 11, 21 could be $\delta 1=14$ to 18 degrees and $\delta 2=19$ to 23 degrees.

Various mechanisms could be used to ensure that the ranges of movement $\delta_1$ and $\delta_2$ do not overlap. For example, in FIG. 8a there is shown a backrest recline limiting mechanism for the front seat 10 in the form of a slot 51 formed in the first arm 15a and pin shown in maximum and minimum recline positions 52a, 52b respectively secured to the second arm. As previously referred to, the first arm 15a is attached to the seat squab 11 and the second arm 15b is attached to the backrest 12. The first and second arms 15a and 15b are pivotally connected via a pivot pin 50 so as to permit the backrest 12 to move relative to the seat squab 11. The range of movement $\delta_1$ is in the example shown 10 degrees and the minimum and maximum recline angles $\theta_{min}$ and $\theta_{max}$ are 8 and 18 degrees respectively.

In FIG. 8b there is shown a backrest recline limiting mechanism for the rear seat 20 in the form of a slot 61 formed in a first arm 25a that is attached to the seat squab 21 and pin shown in maximum and minimum recline positions 62a, 62b respectively secured to a second arm 25b that is attached to the backrest 22. The first and second arms 25a and 25b are pivotally connected via a pivot pin 60 so as to permit the backrest 22 to move relative to the seat squab 21. The range of movement δ2 is in the example shown 10 degrees and the minimum and maximum recline angles $\theta_{min}$ and $\theta_{max}$ are 18.5 and 28.5 degrees respectively.

Therefore by using a pair of backrest recline mechanisms for the front and rear seats 10 and 20 with the above ranges of movement it is not possible for the rear seat backrest 22 to be moved to a position that is more upright than the backrest 12 of the front seat 10. This is because the minimum recline angle θ₂ for the backrest 22 of the rear seat 20 is greater than the maximum recline angle θ₁ for the backrest 12 of the front seat 10.

If an electrical mechanism is used to control the angle of recline then an electronic controller can be used to control the angle of recline to ensure that the rear seat 20 is reclined more than the front seat 10 without limiting the actual range of movement of either seat 10, 20.

For example, by using a sensor on both seats 10, 20 to sense the actual angle of recline then the signals from the sensors can be compared and a simple control algorithm used to prevent the inclination angle of the rear seat 20 from being reduced to a value equal or less than the current angle of the front seat 10. The same sensors could be used to limit the actual range of recline available. For example, the backrest 12 could be controlled so as to allow adjustment up to a recline angle of 23 degrees when the vehicle is in use.

The use of an upright backrest 12 for at least the front seat 10 has several advantages one of which is that the occupant of the rear seat 20 does not feel so impacted upon by the close presence of the backrest 12 of the front seat 10. Compare the upright backrest 12 shown on FIG. 2 with the normally inclined backrest 12' (shown in dotted outline). As can be seen with reference to FIG. 2, the back of the upright backrest 12 is a distance 'd' further from an occupant of the rear seat 20 than would be the case with a normally inclined backrest as indicated by the backrest 12'. In addition, an upright backrest is more comfortable if a high mounted seat is used than if a low mounted seat is used and a high mounted front seat allows the front seat 10 to be positioned closer to the front end of the passenger compartment P. A normally inclined backrest is one that is inclined more than 23 degrees.

Furthermore, because the rear seat backrest 22 is more inclined than the front seat backrest 12 this provides additional rear passenger space. Both of the backrests 12, 22 could be upright. In one embodiment, only the front seat backrest 12 is upright and the rear seat backrest 22 is reclined so that it is not upright. That is to say, the rear seat backrest is reclined more than 23 degrees.

In one embodiment of the invention that enabled a vehicle 1 to be produced that could meet current crash standards while having a length L of less than 2.6 m and a width W of less than 1.3 m, the stagger distance S was 0.34 m, the seat squabs 11, 21 were positioned at a height h above the floor 18 to produce heel contact point $H_{CP}$ (floor) to H-point height H of 0.43 m, the backrests 12, 22 were inclined at 19 and 25 degrees respectively to the vertical and the central longitudinal axes x1-x1 and x2-x2 of the two seats 10, 20 were spaced apart a distance T of 0.39 m.

Figure 4:
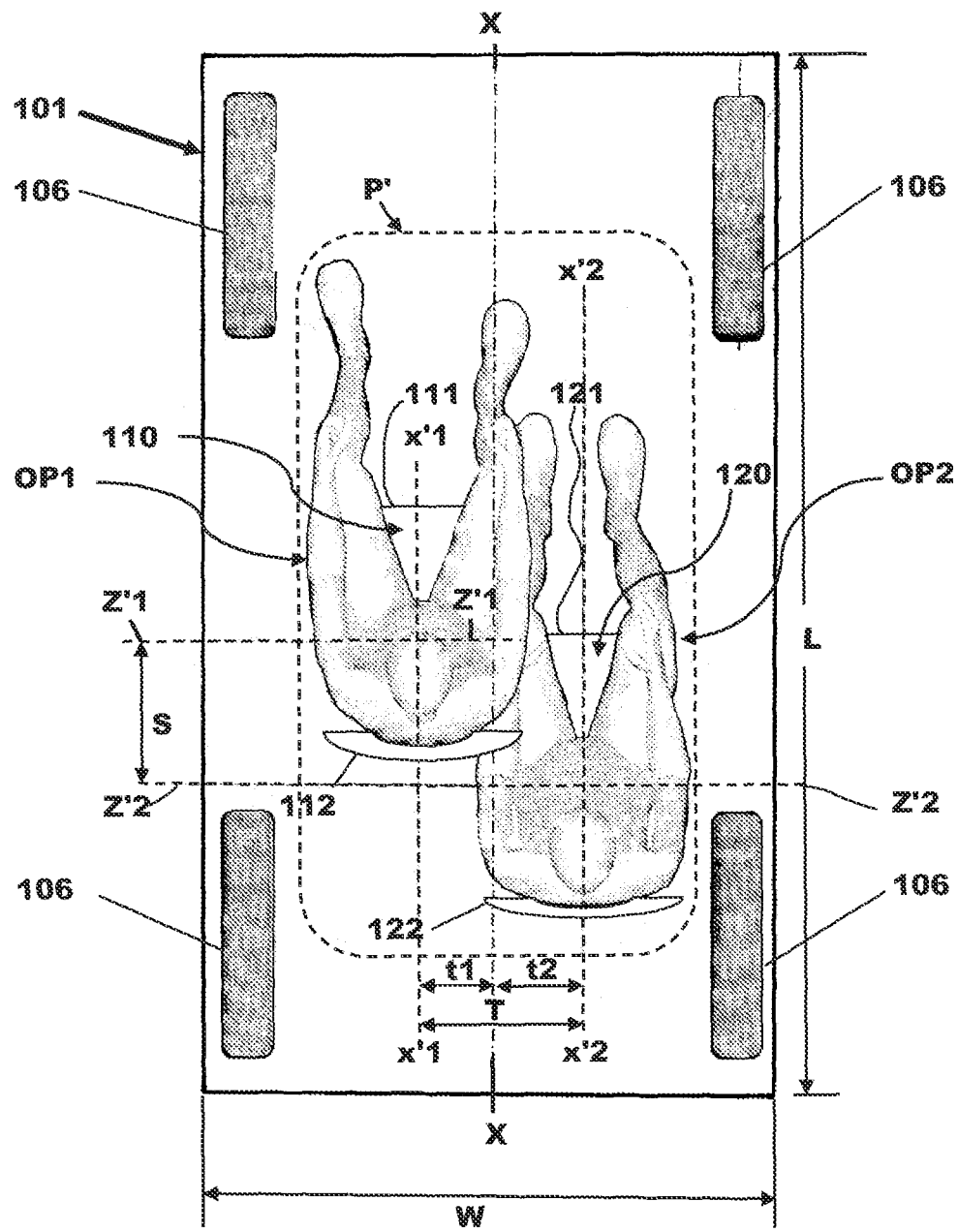
FIG. 4 is a schematic top plan view similar to FIG. 1 but showing a second embodiment of seating arrangement with two occupants in an in use position.
Figure 5:
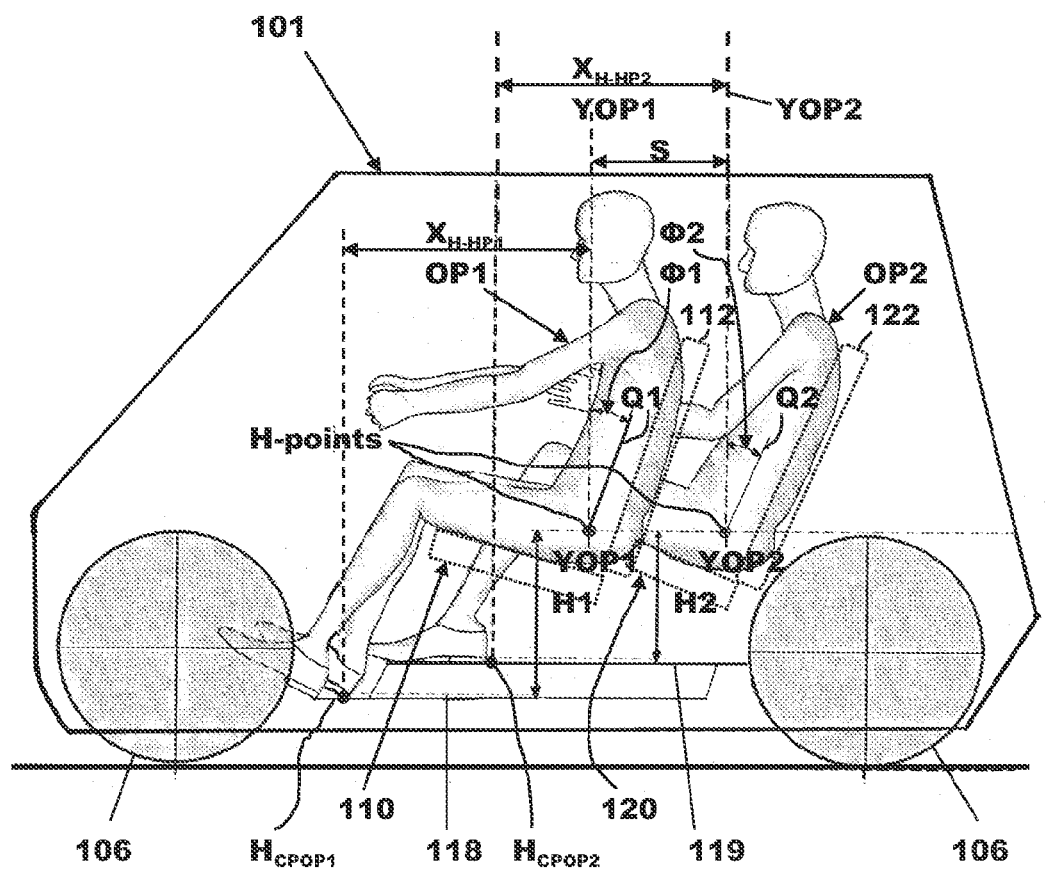
FIG. 5 is a side view of the seating arrangement shown in FIG. 4 in which the seat squabs are omitted for clarity.
Figure 6:
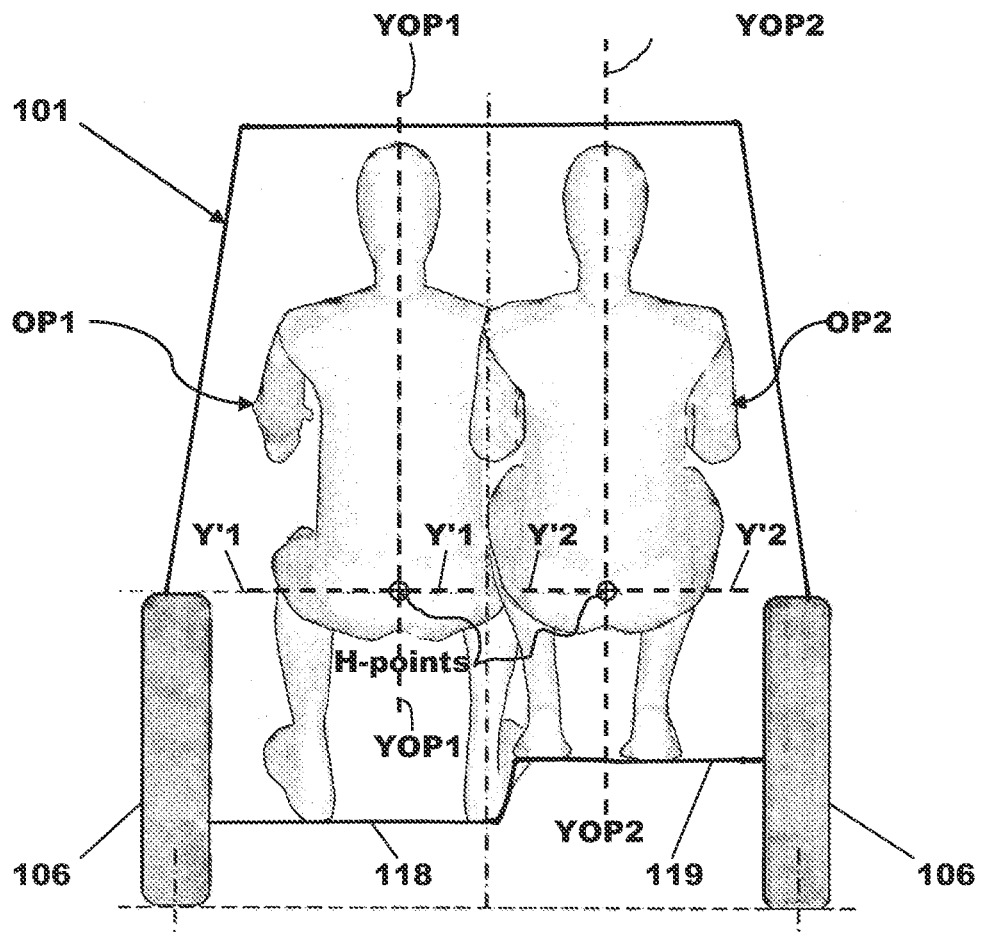
FIG. 6 is a rear view of the occupants shown in FIGS. 4 and 5 with the seats omitted for clarity.

With particular reference to FIGS. 4-6 there is shown a second embodiment of a seating arrangement for accommodating two occupants OP1, OP2 in a powered passenger vehicle 101. The vehicle 101 has a body structure defining front, rear and crush zones so as to comply with current crash standards. The vehicle 101 also has a passenger compartment P' in which the seating arrangement is located and four road wheels 106. The vehicle has a longitudinal length L and a transverse or lateral width W.

The vehicle 101 has a central longitudinal axis X-X that extends from a front end of the vehicle 101 to a rear end of the vehicle 101. As before, the vehicle 101 can be powered by any known source of motive power including, but not limited to a combustion engine, an electric motor or a combination of same. The source of motive power can be mounted at the front of the vehicle 101 or at the rear of the motor vehicle 101 and can drive the vehicle 101 by any suitable form of transmission. A conventional suspension system is used to connect the four wheels 106 to the body structure of the vehicle 101.

The seating arrangement includes front and rear seats 110, 120 each of which has a respective central longitudinal axis x'1-x'1, x'2-x'2 arranged parallel to but on opposite sides of the central longitudinal axis X-X of the vehicle 101.

The front and rear seats 110, 120 are arranged in a staggered relationship to one another. That is to say, the front and rear seats 110 and 120 are offset in a longitudinal direction of the vehicle 101 by a seat stagger distance S measured between two transverse hip pivot axes Z'1-Z'1 and Z'2-Z'2 each of which extends through an H-point for the respective seat 110, 120.

As before, a stagger distance S of between 0.3 m and 0.35 m has been shown to provide a good compromise between vehicle compactness and comfort for the occupants and, in the example shown, the seat stagger distance S is 0.35 m.

The front seat 110 is mounted in the vehicle forward relative to the rear seat 120 by an amount equal to the stagger distance S. That is to say, the front seat 110 is mounted closer to the front end of the vehicle 101 than the rear seat 120. In this case the front seat 10 is a seat for a driver OP1 of the vehicle 101 and the rear seat 120 is a seat for a passenger OP2 of the vehicle 101.

The front seat 110 has a seat squab 111 and a backrest 112 (shown in dotted outline on FIG. 5) arranged at an obtuse angle with respect to the seat squab 111 and the seat squab 111 is attached to a floor 118 of the vehicle 101 by means of a seat mounting structure. The seat mounting structure mounts the respective seat squab 111 in a high position on the floor 118 of the vehicle 101 and may provide the ability to adjust the seat 110 at least in a longitudinal direction of the vehicle 101 so as to suit occupants of differing height.

One advantage of the use of a high mounted front seat 110 is that, it allows the front seat 110 to be positioned closer to a front end of the passenger compartment P'. That is to say, the passenger compartment length can potentially be reduced compared to an arrangement using a non-high mounted front seat (H<0.35 m). A second advantage of using a high mounted front seat is that if the seat 110 is fitted with a fore-aft position adjuster so as to permit the seat 110 to be moveable in a longitudinal direction of the passenger vehicle 101, the H-point height H1 of the seat 110 can remain substantially constant irrespective of the longitudinal position of the seat 110 within the passenger compartment P' of the passenger vehicle 101. That is to say, there is no need to provide a seat height adjuster for the seat 110 thereby saving cost. However, if a fore-aft adjustment is provided for the front seat 110, a mechanism should be provided to prevent users of the passenger vehicle 1 from reducing the stagger distance S below a lower limit such as for example 0.3 m. In the situation where the front seat 110 can move in a fore-aft direction this can be achieved by restricting the rearward travel of the front seat 110 to a position where the minimum stagger distance S is not compromised.

A high mounted seat is one having a seat squab that positions the respective H-point for the seat within a predefined vertical height range such that the H-point height is within a general range of 0.375 m to 0.495 m but may be with a range of 0.4 to 0.45 m.

As before, the H-point of the seat 110 is the position of the respective hip pivot axis Z'1-Z'1 defined in terms of a vertical distance H1 (Y axis) measured from a known reference point and a horizontal distance $X_{H-HP1}$ (X axis) measured from the same reference point. The reference point $H_{CPOP1}$ is the position of contact of a heel of the occupant OP1 with the underlying floor 118. Because the heel of the occupant OP1 is resting on the flat floor 118 of the vehicle 101 the height H1 is effectively the vertical height of the H-point above the floor 118.

It will be appreciated that the actual height of the seat squab 111 is different to the H-point height H1 of the respective H-point but there is a relationship between seat squab height and H-point height H1. That is to say, if the height of the undeflected seat squab 111 is increased, then the respective H-point height H1 will also be increased. The H-point height H1 for the seat 110 is approximately 0.095 m greater than an equivalent height of the undeflected seat squab 111.

The use of a high mounted seat squab 111 permits the backrest 112 of the front seat 110 to be positioned upright, that is to say, the backrest 112 is inclined relative to vertical by a relatively small inclination angle Φ1. As before, the term upright backrest means a backrest having an inclination relative to vertical less than 23 degrees and in this case the backrest inclination angle Φ1 is set to 19 degrees.

In the example shown, the backrest inclination angle Φ1 is measured relative to a vertical axis YOP1-YOP1 which is a vertical axis of the vehicle 101 that extends vertically up from the H-point of the front seat 110. The backrest inclination angle Φ1 is shown measured between the vertical axis YOP1-YOP1 and a plane Q1 that is arranged parallel to the respective backrest 112.

The rear seat 120 has a seat squab 121 and a backrest 122 (shown in dotted outline on FIG. 5) arranged at an obtuse angle with respect to the seat squab 121 and the seat squab 121 is attached to a floor 119 of the vehicle 101 by means of a seat mounting structure.

The seat mounting structure mounts the respective seat squab 121 in a low or normal position on the floor 119 of the vehicle 101 and may provide the ability to adjust the seat 110 at least in a longitudinal direction of the vehicle 101 so as to suit occupants of differing height in which case a mechanism can be used to prevent the minimum value of stagger distance S from being compromised. That is to say, a minimum stagger distance of 0.3 m should be maintained at all times. A low mounted seat is one having a seat squab that positions the respective H-point for the seat below the predefined vertical height range for a high mounted seat. That is to say, a low mounted seat will have an H-point height of less than 0.375 m.

As before, the H-point of the seat 120 is the position of the respective hip pivot axis Z'2-Z'2 defined in terms of a vertical distance H2 (Y axis) measured from a known reference point and a horizontal distance $X_{H-HP2}$ (X axis) measured from the same reference point. The reference point in this case is the position of contact $H_{CPOP2}$ of a heel of the occupant OP2 with the underlying floor 119. Because the heel of the occupant OP2 is resting on the flat floor 119 of the vehicle 101 the height H2 is effectively the vertical height of the H-point above the floor 119.

It will be appreciated that the actual height of the seat squab 121 is different to the H-point height H2 of the respective H-point but there is a relationship between undeflected seat squab height and H-point height H1. That is to say, if the height of the seat squab 121 is increased, then the respective H-point height H2 will also be increased. The H-point height H2 of the rear seat 120 is approximately 0.095 m greater than an equivalent undeflected height of the seat squab 121.

The backrest 122 is not positioned upright, that is to say, the backrest 122 is inclined relative to vertical by an inclination angle Φ2 that is above the range defined as being upright and, as before, the range is an inclination relative to vertical of less than about 23 degrees. In the example shown, the backrest 122 is inclined with an inclination angle Φ2 set at 25 degrees.

The backrest inclination angle Φ2 is measured relative to a vertical axis YOP2-YOP2 which is a vertical axis of the vehicle 101 that extends vertically up from the H-point of the rear seat 120. The backrest inclination angle Φ2 is shown measured between the vertical axis YOP2-YOP2 and a plane Q2 that is arranged parallel to the respective backrest 122.

Therefore the inclination angle of the backrest 121 of rear seat 120 is more than the inclination angle of the backrest of the front seat 110. That is to say, the rear backrest 121 is more reclined than the front backrest 111 thereby increasing space for the passenger.

Each of the hip pivot axes Z'1-Z'1 and Z'2-Z'2 passes through the H-point for the respective seat 110, 120 and falls on a common horizontal plane even though the respective H-point heights H1 and H2 for the two seats 110, 120 are different, one corresponding to the high mounted seat squab 111 and one to the low mounted seat squab 121. This is due to the fact that the floor of the vehicle 101 is longitudinally stepped such that the floor 118 on the driver's side of the vehicle 101 is lower than the floor 119 on the passenger's side. Depending upon the height of the step between the two floors 118, 119 and the magnitudes of the respective H-point heights H1 and H2 the two H-points will either fall on a common plane as shown or be vertically displaced. It is desirable if the two H-point heights H1, H2 do fall on the same horizontal plane because then the two occupants OP1, OP2 sit at approximately the same height.

In the case of the rear seat 120 it is possible to use an H-point height H2 that is below that defined as being high mounted because the rear seat 120 is mounted further away from the front of the passenger compartment. It is therefore not so critical to reduce the longitudinal distance $X_{H-HP2}$ between the heel contact point $H_{CPOP2}$ and the H-point for the rear seat 120 in order to produce a short vehicle.

One of the advantages of the use of a longitudinally stepped floor is that it permits the use of a passenger seat having a backrest that is more reclined than the front seat but enables the respective H-points to lie on a common plane. If a flat floor is used, the use of a low mounted passenger seat will result in the H-point of the driver lying above the H-point for the passenger by an amount equal to the difference in H-point heights.

Therefore, because it is desirable to have a high mounted front seat having an upright backrest and a passenger seat with a backrest that is not upright so as to provide an increased distance between the passenger and the front seat and for the respective H-points for both seats to lie on a common plane, the use of a longitudinally stepped floor is particularly advantageous because it facilitates such a seating arrangement without compromising occupant comfort.

As before, by mounting the front seat squab 111 higher than would normally be the case for a passenger vehicle an occupant of the respective seat 110, normally a driver, has better forward visibility due to their higher seating position and this is particularly advantageous in city or urban motoring where advance warning of a pedestrian in the road greatly improves safety.

Therefore in summary, a high mounted seat squab 111 allows an upright position for the backrest 112 to be used without causing discomfort to an occupant OP1 of the seat 110. The use of an upright backrest 112 for the front seat 110 has the advantage that the occupant OP2 of the rear seat 120 does not feel so impacted upon by the close presence of the backrest 111 of the front seat 110. This feeling of space can be further improved if there is sufficient room in the passenger compartment P' by positioning the backrest 122 of the rear seat 120 in a more inclined position than the backrest 112 of the front seat 110. For example, by using an upright front seat backrest 112 with an inclination angle Φ1 of 19 degrees and a less upright rear seat backrest 122 with an inclination angle Φ2 of 25 degrees the rear seated passenger OP2 will feel less claustrophobic and has more space.

As before, a transverse distance or spacing T between the central longitudinal axes x'1-x'1 and x'2-x'2 of the two seats 110, 120 respectively needs to be kept small in order to minimize vehicle width W. As shown on FIG. 4 each of the central longitudinal axes x'1-x'1, x'2-x'2 of the seats 110, 120 is offset from the central axis X-X of the vehicle 101 by a distance t1, t2 respectively. The two offsets t1, t2 forming in combination the transverse spacing T between the central longitudinal axes x'1-x'1, x'2-x'2 of the two seats 110, 120. The offsets t1, t2 are measured at a rear edge of the respective seat 110, 120.

In the example shown in FIG. 4, the offset t2 is greater than the offset t1 but this need not be the case and the offsets t1, t2 could be identical or the offset t1 could be more than the offset t2.

However, in all cases, at least one of the seats 110, 120 is positioned such that a central longitudinal axis x'1-x'1; x'2-x'2 of the respective seat 110, 120 measured at a rear edge of the respective seat 110, 120 is mounted closer to the central longitudinal axis X-X of the passenger vehicle 101 than would be possible with a symmetrical side-by-side seating arrangement. This is achieved by mounting the respective seat 110, 120 an offset distance t1 or t2, measured from the central longitudinal axis x'1-x'1; x'2-x'2 at a rear edge of the respective seat 110, 120 to the central longitudinal axis X-X of the passenger vehicle 101, that is less than half the width of the respective seat 110, 120.

In a case where a respective seat 110, 120 has a width of 0.44 m then it is offset from the central axis X-X no more than 0.22 m In one embodiment of the vehicle 101 that could meet current crash standards the floor to H-point height of the front seat 110 was 0.43 m, the H-point of the rear seat 120 was 0.325 m, the backrest 112 was inclined at 19 degrees to the vertical, the backrest 122 was inclined at 25 degrees to the vertical and the central longitudinal axes x'1-x'1, x'2-x'2 of the two seats 110, 120 were spaced apart a distance 0.39 m from one another.

Figure 9:
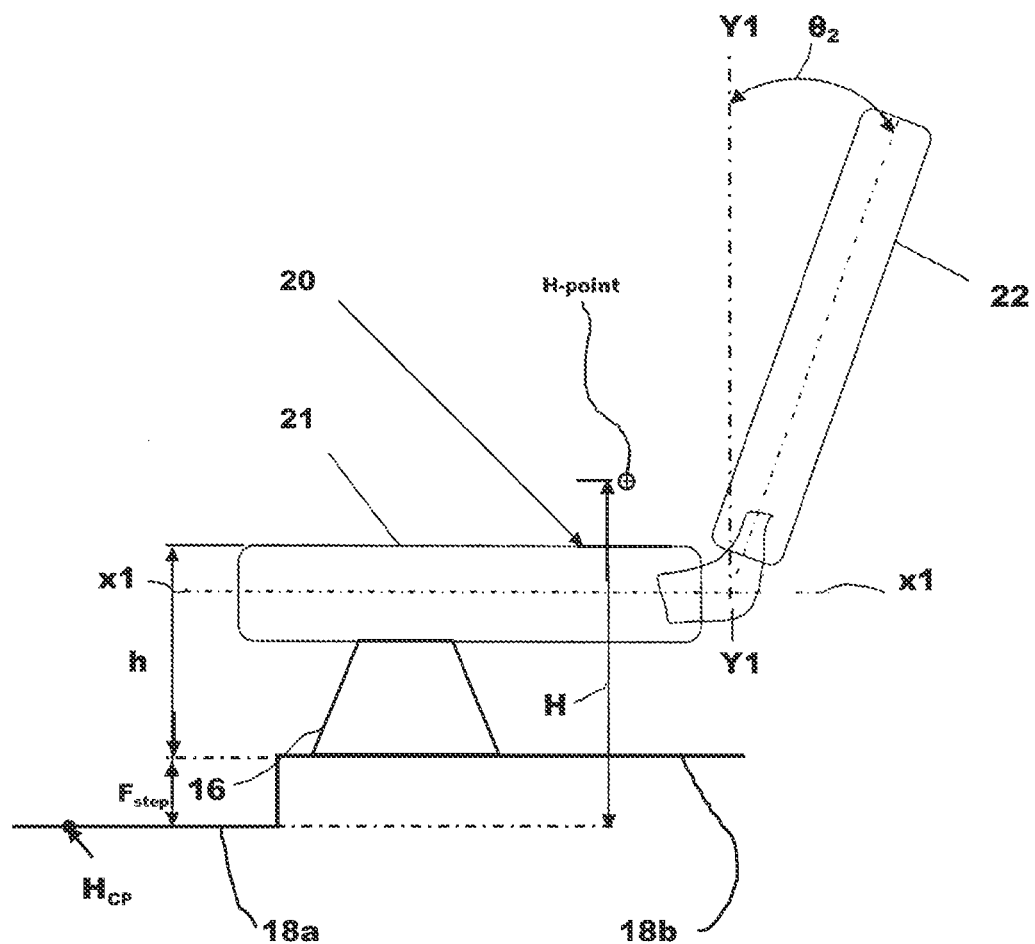
FIG. 9 is an elevational side view similar to that of FIG. 2 but showing how the invention can be applied to a rear seat of a vehicle having a transversely stepped floor.

With particular reference to FIG. 9 there is shown how the invention can be applied to a rear seat such as the rear seat 20 when the vehicle has a transversely stepped floor.

The seat 20 is in most aspects identical to the seat 10 shown in FIG. 2. The angle θ2 of the backrest 22 is in this case within the range of upright mounted backrests that is to say less than 23 degrees.

The primary difference between this embodiment and that shown in FIG. 2 is that, even though the H-point height H is identical to that shown in FIG. 2, the seat support 16 is not as tall as is the case in the embodiment shown in FIG. 2.

The floor has a step of height $F_{step}$ between a front lower floor 18a and a rear upper floor 18b upon which the seat 20 is mounted. The height h of the seat squab 21 is less by an amount equal the height $F_{step}$ of the step between the lower floor 18a and the upper floor 18b than the height of the seat squab shown in FIG. 2 to compensate for the step while providing the same H-point height H as that shown in FIG. 2. That is to say, the height H in a vertical direction between the heel contact point $H_{CP}$ (which lies on the lower floor 18a) and the H-point is the same as that shown in FIG. 2 and so that the seat squab 21 is still high mounted even though the actual height h of the seat squab 11 above the floor 18b would suggest otherwise.

The use of a rear floor 18b that is stepped up from the front floor 18a is advantageous because it provides more room under the floor which is useful, particularly in a compact vehicle where the room available to package components of the motor vehicle is very limited. For example and without limitation, it would be possible to package a battery for the motor vehicle under the rear floor or part of an engine if the motor vehicle has a rear mounted engine.

Therefore, whether a seat is high mounted depends upon the vertical height H between the respective heel contact point $H_{cp}$ and the respective H-point and not the height of the respective seat squab above the floor upon which the seat is mounted nor the height of the seat squab above the road.

Therefore in summary, by providing a seating arrangement in which a rear seat has a backrest that is more inclined than a front seat more room is made for the passenger.

In one advantageous embodiment, the floor of the motor vehicle is longitudinally stepped so that a front seat for a driver is mounted high and uses an upright backrest and a rear seat for the passenger is not high mounted and has a non-upright backrest and the respective H-points for the two seats lie on a common horizontal plane.

In another advantageous embodiment, the floor of the motor vehicle is transversely stepped so that a rear part of the passenger compartment is stepped up compared to a front part of the passenger compartment thereby providing more room under the rear floor of the passenger compartment.

For example another solution in accordance with the invention is to interlink the front and rear backrests such that whatever angle the front seat backrest is set to, the angle of the rear seat backrest is a predefined angle offset from this so that the rear seat backrest remains more inclined.

The interlink could be done mechanically via for example a chain drive, belt drive, link arm or Bowden cables between the backrests or via a central worm gear shaft driving a worm gear on the inboard recline hinge of front and rear seats.

A mechanical linking works well because the two seats overlap on the central longitudinal axis of the vehicle, providing a central location to link the two seat mechanism.

The interlink could also be done electronically by for example varying a forward-recline seat stop on the rear seat backrest depending on the angle of the front seat backrest or, if the seats are motorized to automatically recline the rear seat backrest if the front seat backrest is reclined such that a predefined offset angle would not be breached.

The recline mechanisms could be interlinked by electronic logic systems that include recline sensing devices and at least the rear seat backrest may have a powered recline adjuster to ensure that the backrests remain at a predetermined offset angle with respect to each other irrespective of which angle the front seat backrest is set to.

If both of the backrests includes a recline mechanism then at least the rear seat should have an adjustable rotation stop for the backrest to stop the forwards rotation of the backrest at a predetermined position. The recline mechanism for the front seat backrest could then be interlinked to the adjustable rotation stop rear seat backrest by means of a mechanical device to ensure that the rear seat backrest angle with respect to the front seat backrest angle may not be smaller than a predetermined offset angle irrespective of what angle the front seat backrest is set to thereby maintaining the rear seat backrest more reclined than the front seat backrest.

The adjustable rotation stop of the rear seat backrest could be a powered adjustable rotation stop and an electronic logic system could include one or more recline sensing devices arranged to ensure that the rear seat backrest angle with respect to the front seat backrest angle may not be smaller than a predetermined offset angle irrespective of what angle the front seat backrest is set to.

The recline mechanism for the rear seat backrest may also include a mechanical or electronic decoupling device for the mechanical or electronic link between the front seat backrest and the rear seat backrest to permit the rear seat backrest to be folded flat for load carrying purposes irrespective of any rotation limits set by the mechanical or electronic interlink between the front and rear backrests.

The recline mechanism for the rear seat backrest may also include a mechanical or electronic decoupling device for the adjustable backrest angle stops to permit the rear seat backrest to be folded flat for load carrying purposes irrespective of any rotation limits set by the rotation stops.

As yet one further embodiment, the rear seat backrest may be fixed and the front seat backrest may have a mechanical or electronically controlled recline mechanism to permit the front seat backrest to be reclined within a predefined range. In such a case the predefined range has a maximum inclination angle limit that is less than the fixed inclination angle of the rear seat backrest.

It will also be appreciated that although the squabs of the two seats are as shown as simple rectangles this need not be the case and at least one of the squabs could be shaped to assist with meeting a seat stagger distance and lateral seat spacing.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is for illustrative purposes. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A seating assembly for a vehicle comprising:
    a stepped floor that includes an upper portion and a lower portion;
    a front seat disposed on the lower portion;
    a rear seat arranged in a staggered relationship behind the front seat, wherein the front seat is mounted high and has an upright backrest and the rear seat has a backrest that is more reclined than the backrest of the front seat.

2. The seating assembly of claim 1, wherein an upright backrest is a backrest having an inclination relative to vertical of less than 23 degrees.

3. The seating assembly of claim 1, wherein the rear seat has an inclination relative to vertical of more than 23 degrees.

4. The seating assembly of claim 1, wherein an H-point height of the front seat measured relative to a heel contact point is within a range of 0.375 m to 0.495 m.

5. The seating assembly of claim 4, wherein an H-point height of the front seat measured relative to a heel contact point is within a range of 0.4 m to 0.45 m.

6. The seating assembly of claim 1, wherein the backrest of the rear seat is arranged at a fixed inclination angle and the backrest of the front seat has a recline mechanism to permit the front seat backrest to be reclined within a predefined range, and wherein the predefined range has a maximum inclination angle limit that is less than the fixed inclination angle of the rear seat backrest.

7. The seating assembly of claim 1, wherein each of the backrests of the front seat and back seat has a recline mechanism to permit the respective backrest to be reclined within a predefined range having respective maximum and minimum inclination angle limits and the maximum inclination angle limit for the front seat backrest is less than the minimum inclination angle limit for the rear seat backrest.

8. The seating assembly of claim 1, wherein each of the backrests of the front and rear seats include a recline mechanism and the recline mechanisms for the front and rear seat backrests are operably linked to each other by means of a mechanical device to ensure that the backrests remain at a predetermined offset angle with respect to each other irrespective of the angle the front seat backrest is set to so as to maintain the rear seat backrest more reclined than the backrest of the front seat.

9. The seating assembly of claim 1, wherein both of the backrests include a recline mechanism and the recline mechanisms are interlinked by at least one electronic logic system that includes one or more recline sensing devices for the front and rear seat backrests and at least the rear seat backrest has a powered recline adjuster, wherein the at least one electronic logic system is arranged to ensure that the two backrests remain at a predetermined offset angle with respect to one another irrespective of the angle the front seat backrest is set to so as to maintain the rear seat backrest more reclined than the backrest of the front seat.

10. The seating assembly of claim 1, wherein both of the backrests include a recline mechanism and at least a passenger seat recline mechanism includes an adjustable rotation stop for the rear seat backrest to prevent forward rotation of the rear seat backrest beyond a predetermined position and the front seat backrest recline mechanism is interlinked to the adjustable rotation stop for the rear seat backrest by means of a mechanical device to ensure that a minimum offset angle is maintained between the rear seat backrest and the front seat backrest irrespective of the angle that the front seat backrest is set to so as to maintain the rear seat backrest more reclined than the backrest of the front seat.

11. The seating assembly of claim 1, wherein both of the backrests include a recline mechanism and at least the passenger seat recline mechanism includes a powered adjustable rotational stop for the rear seat backrest to prevent forward rotation of the rear seat backrest beyond a predetermined position, wherein the front seat backrest recline mechanism and the adjustable rotation stop of the rear seat incline mechanism are interlinked by at least one electronic logic system that includes one or more recline sensing devices for the front and rear seat backrests, wherein the at least one electronic logic system uses the powered adjustable rotation stop to ensure that a minimum offset angle is maintained between the rear seat backrest and the front seat backrest irrespective of the angle the front seat backrest is set to so as to maintain the rear seat backrest more reclined than the backrest of the front seat.

12. The seating assembly of claim 1, wherein a decoupling device is provided to permit the rear seat backrest to be folded forward irrespective of the actions of any interlink between the front and rear seat backrests.

13. The seating assembly of claim 1, wherein the rear seat backrest recline mechanism includes one of a mechanical decoupling device and an electronic decoupling device for decoupling the interlink between the front and rear seat backrests to permit the rear seat backrest to be folded flat for load carrying purposes.

14. The seating assembly of claim 1, wherein the stepped floor is stepped longitudinally relative to the longitudinal extent of the vehicle.

15. The seating assembly of claim 1, wherein the stepped floor is stepped transversely relative to the longitudinal extent of the vehicle.

16. A vehicle seating assembly comprising:
a front seat;
a rear seat arranged in a staggered relationship behind the front seat, wherein the front seat is mounted high and has an upright backrest and the rear seat has a backrest that is more reclined than the backrest of the front seat.

17. The vehicle seating assembly of claim 16, wherein both of the backrests include a recline mechanism and the recline mechanisms are interlinked by at least one electronic logic system that includes one or more recline sensing devices for the front and rear seat backrests and at least the rear seat backrest has a powered recline adjuster, wherein the at least one electronic logic system is arranged to ensure that the two backrests remain at a predetermined offset angle with respect to one another irrespective of the angle the front seat backrest is set to so as to maintain the rear seat backrest more reclined than the backrest of the front seat.

18. The seating assembly of claim 16, wherein both of the backrests include a recline mechanism and at least the passenger seat recline mechanism includes an adjustable rotation stop for the rear seat backrest to prevent forward rotation of the rear seat backrest beyond a predetermined position and the front seat backrest recline mechanism is interlinked to the adjustable rotation stop for the rear seat backrest by means of a mechanical device to ensure that a minimum offset angle is maintained between the rear seat backrest and the front seat backrest irrespective of the angle that the front seat backrest is set to so as to maintain the rear seat backrest more reclined than the backrest of the front seat.

19. The seating assembly of claim 16, wherein both of the backrests include a recline mechanism and at least a passenger seat recline mechanism includes a powered adjustable rotational stop for the rear seat backrest to prevent forward rotation of the rear seat backrest beyond a predetermined position, wherein the front seat backrest recline mechanism and the adjustable rotation stop of the rear seat incline mechanism are interlinked by at least one electronic logic system that includes one or more recline sensing devices for the front and rear seat backrests, wherein the at least one electronic logic system uses the powered adjustable rotation stop to ensure that a minimum offset angle is maintained between the rear seat backrest and the front seat backrest irrespective of the angle the front seat backrest is set to so as to maintain the rear seat backrest more reclined than the backrest of the front seat.

* * * * *